United States Patent
Nordström et al.

(10) Patent No.: US 7,054,873 B2
(45) Date of Patent: May 30, 2006

(54) TELECOMMUNICATIONS NETWORK RESOURCE HANDLING ARRANGEMENT AND METHOD

(75) Inventors: Klas Nordström, Mölndal (SE); Hans Augustsson, Göteborg (SE); Lars Samuelsson, Askim (SE); Per-Anders Hofgren, Göteborg (SE); Elisabeth Svala, Borås (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 138 days.

(21) Appl. No.: 09/993,843

(22) Filed: Nov. 5, 2001

(65) Prior Publication Data

US 2002/0073193 A1    Jun. 13, 2002

Related U.S. Application Data

(63) Continuation of application No. PCT/SE00/00860, filed on May 4, 2000.

(30) Foreign Application Priority Data

May 4, 1999  (SE)  .................................... 9901588

(51) Int. Cl.
*G06F 17/00* (2006.01)
(52) U.S. Cl. .................. 707/100; 707/10; 707/101; 707/104.1; 709/223; 709/224; 709/226; 709/229
(58) Field of Classification Search ................ 707/10, 707/100, 101, 104.1, 103 R; 709/223, 224, 709/226, 229, 202, 203
See application file for complete search history.

(56) References Cited

U.S. PATENT DOCUMENTS

| | | | | |
|---|---|---|---|---|
| 4,748,658 | A * | 5/1988 | Gopal et al. | 379/221.01 |
| 5,640,505 | A | 6/1997 | Hearn et al. | |
| 5,696,697 | A * | 12/1997 | Blau et al. | 707/103 R |
| 5,725,979 | A | 3/1998 | Henderson et al. | |
| 5,737,736 | A * | 4/1998 | Chang | 707/102 |
| 5,761,432 | A * | 6/1998 | Bergholm et al. | 709/226 |
| 5,778,049 | A | 7/1998 | Young et al. | |
| 6,052,722 | A * | 4/2000 | Taghadoss | 709/223 |
| 6,141,777 | A * | 10/2000 | Cutrell et al. | 714/47 |
| 6,243,396 | B1 * | 6/2001 | Somers | 370/469 |
| 6,526,397 | B1 * | 2/2003 | Chee et al. | 707/1 |

FOREIGN PATENT DOCUMENTS

EP    0 820 203 A2    1/1998

* cited by examiner

*Primary Examiner*—Jeffrey Gaffin
*Assistant Examiner*—Jacques Veillard
(74) *Attorney, Agent, or Firm*—Roger Burleigh

(57) ABSTRACT

A resource handler for use in an operational support structure for managing a telecommunications network. The handler includes a service and resource database containing information regarding network resources. The database arrangement is structured so that each resource in the network has a time of existence as well as a place in a hierarchy of parent/child relations. The resource is defined by the following data: a point identifier that has characteristics associated with it, in the form of an abstract description of the resources capabilities; an abstraction of a common network element represented by a group of points that are considered to belong together, and a connection, which is defined by two connected points.

24 Claims, 4 Drawing Sheets

TELECOMMUNICATIONS NETWORK RESOURCE HANDLING ARRANGEMENT AND METHOD

This application is a continuation of International Application No. PCT/SE00/00860 filed on May 4, 2000, which International Application was published by the International Bureau in English on Nov. 9, 2000.

BACKGROUND

The present invention relates to a resource handler for use in an operational support structure for managing a telecommunications network, comprising a service and resource database arrangement containing information regarding network resources. The invention also relates to a method of structuring information in a resource handler database arrangement for use in such an operational support structure. Also, the invention relates to a use of a resource handler for a service type handler in an operational support structure for a telecommunications network, for creating and maintaining service type recipes and their relations.

Resource management in operation support systems for telecommunication is difficult due to the size and complexity of these types of networks. A telecommunication network normally changes constantly as new resources/services are added, and as old superfluous resources/services are removed or replaced. Often, a lack of information regarding available/redundant resources lead to stove-pipe solutions for particular services or networks with high levels of duplication. The lack of up-to-date information and the resulting duplication lead to higher management costs for the network operator. Sometimes resource investments are unnecessary because redundant resources may actually be available. There may be resources that supposedly are engaged by old services that are no longer active or have been replaced by new services that use other resources.

An operational support structure for a telecommunications network is for example described in U.S. Pat. No. 5,640,505. This support structure is divided into a set of domains each of which provides a particular management function for the network. This document teaches a general support structure but it provides very little details for implementing such a structure. Thus, there is no definite solution to the problem of how to handle network resources so that duplication is avoided.

EP-A-0 820 203 shows a method and an arrangement for making use of resources in a telecommunications network. This arrangement/method is however not satisfactory for several reasons. For example, it does not satisfactorily take into account the time that a resource exists. To do that, attributes have to be added containing information about time of existence. However, this would have to be done for every resource to make it meaningful, which would considerably reduce the performance.

Moreover it does not give a solution to the problem of adding entirely new attributes. It is also a disadvantage that it cannot be used by arbitrary processes but it is specifically designed to support the object-oriented SDI-process. The solution in EP-A-0 820 203 is not sufficiently flexible.

Ideally the service and resource database should be able to represent all existing and all future types of telecommunication equipment and network topologies in a simple data model in order to be able to manage the resources of an arbitrary network.

SUMMARY

One object of the present invention is to provide a flexible resource handler and method relating thereto which can be used by arbitrary processes. Another object is to enable easy addition of new attributes (preferably dynamically) under operation, as well as new service types and new resources types. Particularly it is an object to enable modelling and handling of equipment with both transmissive and non-transmissive properties.

According to a first aspect of this invention, there is provided a resource handler for use in an operational support structure for managing a telecommunications network, comprising a service and resource database arrangement containing information regarding network resources. The database arrangement is structured so that each resource in the network has a time of existence as well as a place in a hierarchy of parent/child(s) relations. The resource is defined by the following data:

- a point identifier that has characteristics associated to it, in the form of an abstract description of its capabilities;
- an abstraction of the common network element in the sense of a group of points that are considered to belong together; and
- a connection which is defined by two connected points.

Preferably, the point identifier also has characteristics associated to it, in the form of a list of label/value pairs.

According to one advantageous embodiment of the invention, the element acts as a container for points, with the implicit characteristic that points on elements are possible to cross-connect.

The database arrangement may be structured so as to model a topological view, i.e. how the resources are connected together. It may also be structured so as to model a time view, i.e. when the resources exist.

The database arrangement may be structured so as to model a hierarchic view, i.e. how the resources are related in parent/child relationships. It may also be structured so as to model a characteristic view, i.e. by means of a list of characteristics of each resource. Also, the database is structured so as to model a usage view, i.e. which resources are combined to form a complete service instance and the time when that service instance exists.

Preferably, the topological view, the time view, the hierarchic view, the characteristic view and the usage view are integrated in a data model for enabling control of each resource and the use of it in service instances.

Preferably the database arrangement comprises a first, separate, database and a second, separate, database. One of the databases is used for resource types and resource instances whereas the other is used for service types and service instances.

According to a second aspect of this invention, there is provided a method of structuring information in a resource handler database arrangement for use in an operational support structure for managing a telecommunications network, comprising the steps of allocating each resource in the network a time of existence as well as a place in a hierarchy of parent/child(s) relations, and defining each resource by the following data:
- a point identifier that has characteristics associated to it, in the form of an abstract description of its capabilities;
- an abstraction of the common network element in the sense of a group of points that are considered to belong together; and
- a connection which is defined by two connected points.

According to a third aspect of this invention, there is provided a use of a resource handler for a service type handler in an operational support structure for a telecommunications network, for creating and maintaining service type recipes and their relations.

Preferably, the service type recipes provides a framework for service types, operations on service types, parameters on service types, hierarchical relations between service types, hierarchical parameter relationship, and translation of service types and associated parameters values into resource requirements and service type requirements.

The service type handler may be used for selecting between different types of required services, different types of required resources and different service instances.

Advantageously, the selected resources requirements are transferred to a resource handler that does the actual resource allocation.

BRIEF DESCRIPTION OF THE DRAWINGS

The invention will in the following be further described in a nonlimiting way with reference to the accompanying drawings in which.

DETAILED DESCRIPTION

As there are many aspects of a telecommunications system, a structure of the information has to be made into parts for interaction between product/service types and product/service instances. For example, it is possible to have one part of the system handling product/service types and their translation to product/service instances and/or references to resources, a second part for binding information about product/service types and product/service type pricing, a third part for the product/service instances and a fourth part for keeping track of all procedural code for data manipulation.

Figure 1:
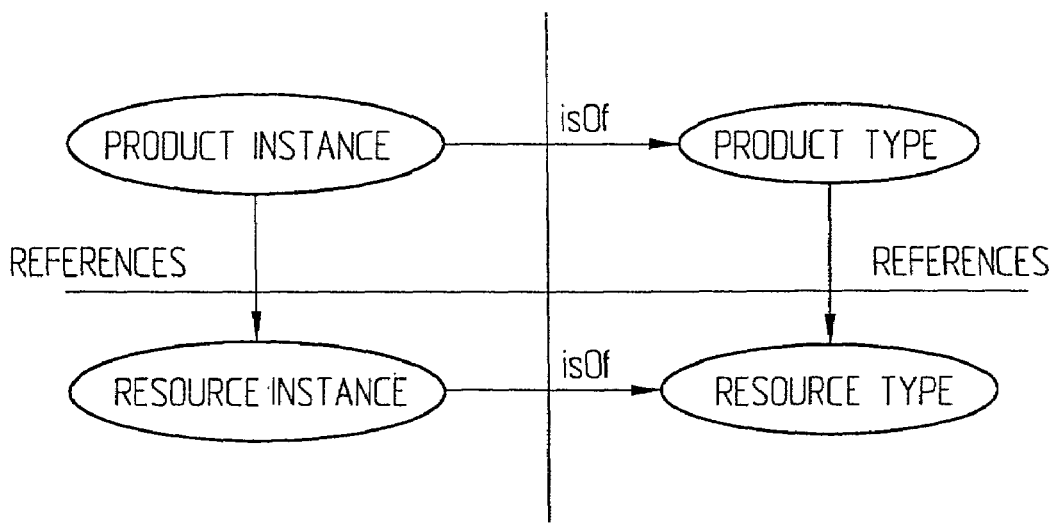
FIG. 1 schematically illustrates the relationship between the concepts of product (service) instance/type and resource instance/type, FIG. 2 schematically illustrates the relationship between elements, points and connections.

This basic modeling idea is illustrated in FIG. 1, and it comprises four basic areas (domains), the product/service type, the product/service instance, the resource type and the resource instance. The type areas are to be seen as where the drawings and design specifications are placed and the instance areas are where the raw material and the ready products/service are located. Thus, it is very important to make a clear distinction between the type of a product/service and the instance of a product/service as well as between a resource type and a resource instance.

Each product/service type is defined by name, parameters, revision level and behavior. Thus the product/service type can be viewed as a parameterized template for a product/service instance. Each product/service type has one or more revisions. As a product/service type may consist of other product/service types, some product/service types are placed in a hierarchy of parent/child relations. It is of utmost importance that a product/service type has no knowledge of the product types it is part of. It may know things about the product/service types it consists of. One parent product/service type may have the possibility to fork to one or several child product types.

A product/service instance is the realization of a product/service with all parameter values set to their final values. Since the product/service types have a hierarchy, the product/service instances also must have a hierarchy. The product/service process is the procedure referenced to by the product/service type. It contains the precise and complete instructions how to manipulate a product/service instance.

The concept of resources is used in order to have a concept for all "real" things in the system. It is very important to distinguish between two things, resource creation, e.g., installation of a new telephone line, and resource allocation, e.g., changing the state of an existing telephone line from unused to used.

The resource type is the identity of an abstract description of the resource needed to implement a product type. Product/service types having children may have references to resource types. Product/service types having no children must have references to resource types.

The resource instance is the actual instantiation of a resource type. Product/service instances having children may have references to resource instances. Product/service instances having no children must have references to resource instances.

Figure 2:
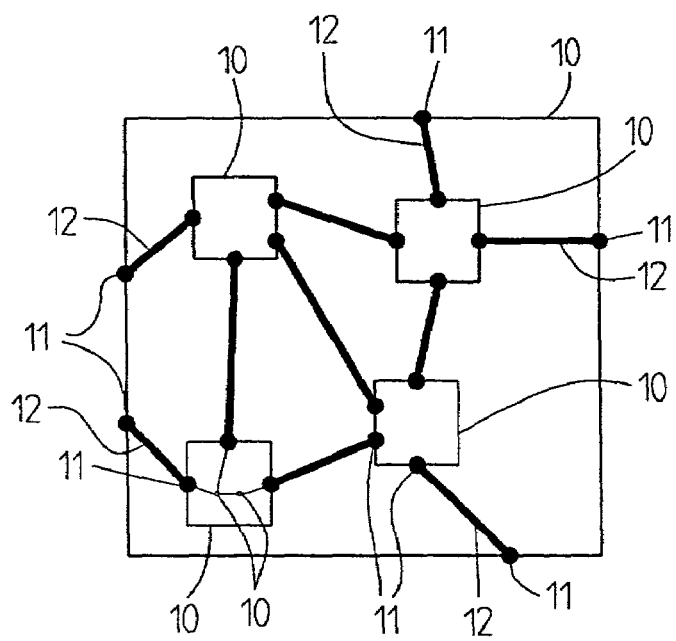

The relationship between elements, points and connections is illustrated in FIG. 2 which is an abstract graphic view of a telecommunication network. Each of the squares in FIG. 2 represents an element 10, the dots are points 11 and the fat lines are connections 12. The thin lines in the lower left element are also connections, only scaled down in width to fit the element. This is represented in the Resource Type and Instance Data Base (SRDB) according to this invention, in the form of tables in a relational database.

Having an SRDB is to have a formal and abstract model for describing a telecommunication network, its parts, their capabilities, how the parts are connected, by whom and when a part is used and so on. What exists in SRDB are lists of elements, the points on these elements, the capabilities/attributes of each point and how the points are connected. These lists (in the form of database tables) are filled with information of what equipment exists (and when it exists), what it can do and if it is used by someone.

The point 11 is known under many names, such as port, termination point, external access point, binding post etc. in the real world. In SRDB they are abstracted to one concept, the point which in essence is an identifier. To distinguish between different types of points, every point must have a type that is a formal abstract description of its capabilities. A point type may have one or several capabilities. A point must always belong to an element, it can not exist on its own.

The element 10 is in essence a group of points that are considered to belong together. To be an element, the points that are attached to it must have full connectivity to each other, i.e. any point must be possible to cross-connect to any other point within the same element. This connectivity may be restrained a bit as the capability/attribute types of the points may have the requirement that the same capability/attribute must exist on both points in order to be able to cross-connect.

The connection is the very information that says that a point is connected to another point. In reality this is a pair of points. There are basically two kinds of connections, the infrastructure connection, i.e. a wire, and a cross-connect, which is controllable.

The capability is a collection of attributes. Each attribute is in essence a pair consisting of the name of a parameter and the value of the parameter. This is the formal way to describe the characteristics of a point type.

The service instance is the entity that in itself has all the common data regarding the resources used by it and it has references to these resources.

Particularly attributes are only connected to points and relations are used to connect points to elements and to connect points to connections. There may however be a few fixed attributes also on elements and connections. They are selected very carefully since they should always be there such as time of existence, name of the resource etc. The main point is that there is no possibility whatsoever to connect optional or any attributes, attribute, to elements or connections. Instead all the characteristic features are in the points where it is possible to provide a connection to an arbitrary number of attributes. The elements actually merely function as "place-holders" to which the points can be connected. The functioning of connections is similar i.e. their functioning is to indicate that two points are connected.

Still further, in the database arrangement of the present invention, every resource (element, point, connection) preferably has a time of existence, which strongly underlines the consciousness about the meaning of time.

In a particular implementation the database arrangement comprises fields enabling the use of a regular code (e.g. C, Java™) if needed, which gives a high flexibility. According to the invention every resource does not necessarily have an (explicit) connection.

In a most advantageous implementation of the invention it is possible to distinguish between different types of attributes, meaning, first, that the objects are "typed", and, second, that it can be distinguished between said types. It is preferable at least distinguished between attributes of type "transmissive" and of type "non-transmissive". One example on a resource with non-transmissive attributes is an e-mail account. It has a memory but no transmissive attributes like e.g. bandwidth. Through "typing" the attributes it gets easy to model and manage equipment having both transmissive and non-transmissive properties, i.e. equipment etc. which in principle fall outside the common scope of the telecommunication network, like servers.

The concept of hierarchy is used in many places in SRDB in the form that elements 10, points 11 and connections 12 may have children, i.e. they may have an internal structure. This is described in the form of a parent/child relationship in a table. Preferably, according to the invention the model is clearly hierarchical with parent/child relations both in elements, points and connections.

Figure 3:
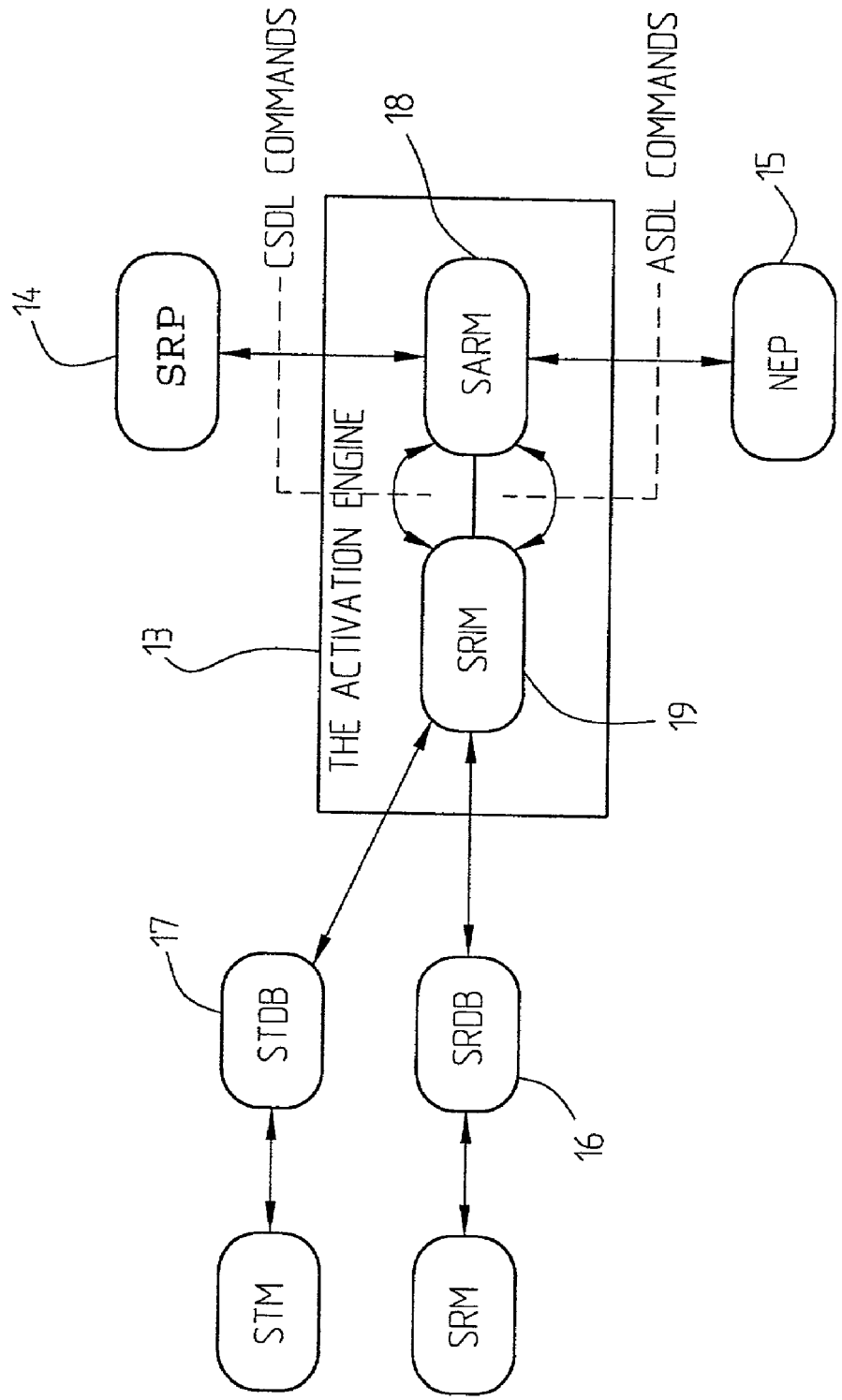
FIG. 3 shows the system environment of the service and resource database arrangement of the service configuration.
Figure 5:
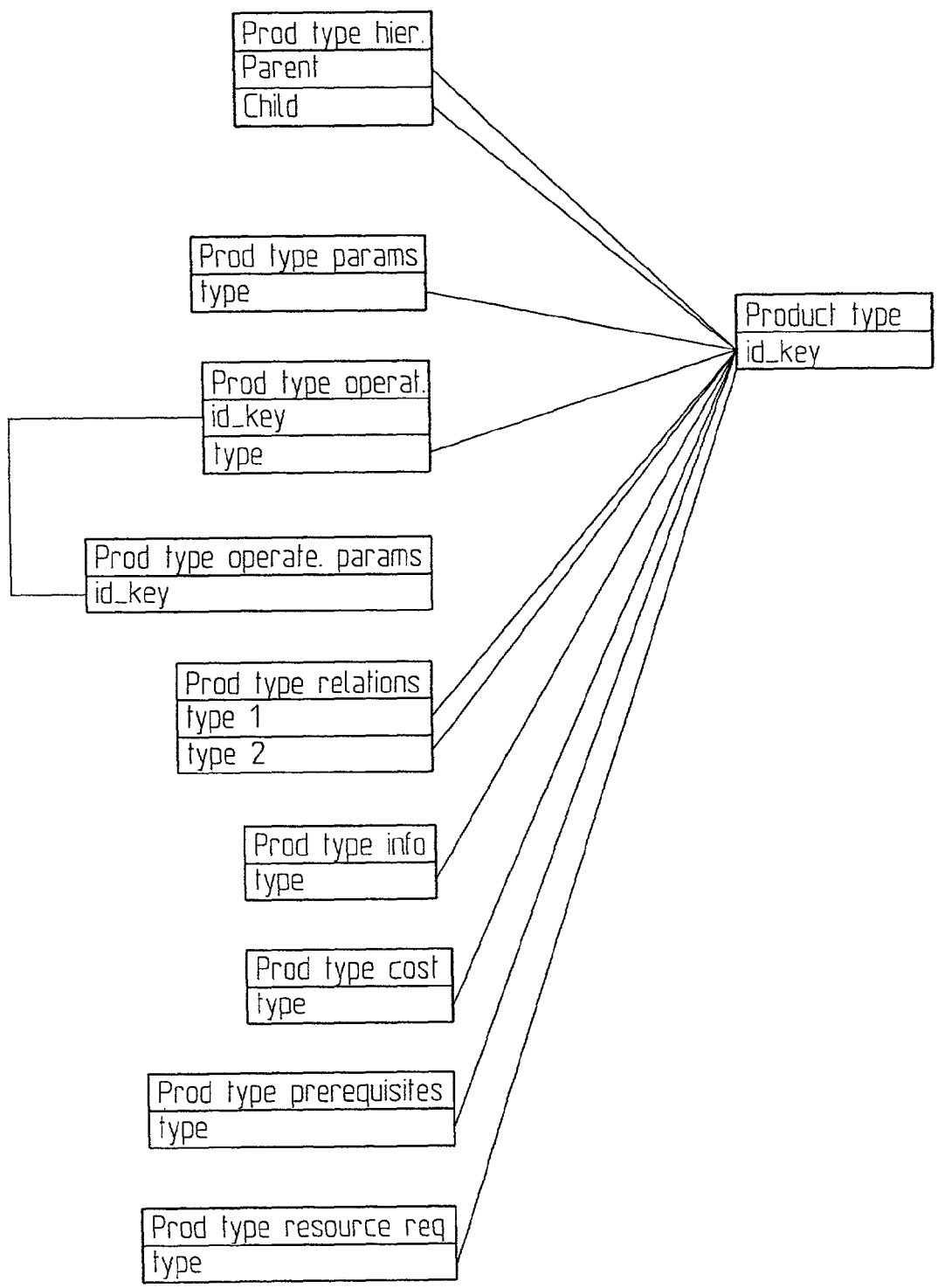
FIG. 5 illustrates the table relations and product type definitions.

FIG. 3 shows the system environment where the Service Configuration (SC) mainly consist of the activation engine 13, the Service Request Processor (SRP) 14 for upstream system communication, the Network Element Processor (NEP) 15 for downstream system communication, Resources Type and Instance Database (SRDB) 16 for information about the network resources, and Service Type and Instance Database (STDB) 17, see FIG. 5, for the service type and instance hierarchy. Internally, the activation engine 13 consist of Service Activation Request Manager (SARM) 18 a part of an Automatic Service Activation Program (ASAP) and the Service and Resource Instance Manager (SRIM) 19.

In a particularly advantageous implementation of this invention the database arrangement is separated into two databases, (SRDB and STDB), one of which, SRDB, contains the resource types and resource instances, the other, STDB, of which contains the service types and the service instances.

The connection between STDB and SRDB is such that for external uses of the database arrangement, messages about which attributes are wanted, are sent from the service type and instance part (STDB) (down) to the resource type and instance part (SRDB). It is thus a very loose coupling. The intention of using such a loose coupling or connection is that sometimes the complexity involved with the service types is not wanted. Instead "raw" or "pure" resource types/instances can be obtained directly from the resource part (SRDB) of the database arrangement.

Through separating the database arrangement as referred to above it is possible to define service types using resource types (with new attributes) which still not are defined in the resource part.

The STDB 17, see FIG. 5, contains all information on how to translate a specific service type to resources, to enable creation of new service instances. The SRDB 16 is the information source and depository of SC.

A simplified view of the flow of information is that a Common Service Description Layer (CSDL) command is sent by the SRP 14 to SARM 18 where it is translated to an Atomic Service Description Layer ASDL command and routed to SRIM 19. The SRIM 19 then asks STDB 17 and SRDB 16 for additional information, which is used to make a new CSDL command that is translated to an ASDL command and routed to the NEP 15. The response from the NEP 15 follows in principle the same way backwards, where return status and data is used to update the SRDB 16.

The creation of a DuoCom instance is now used as an example of how to use the information in the data structures. The product DuoCom is assumed to consist of the sub products ISDN Access, E-mail, Personal Home Page and 020-connection. These five products, together with all relevant parameters, parameter values, resource definitions, location of resources, product information, product type cost, revision levels etc. and the associated provisioning control are considered to be entered in the product type data structure.

Step zero is that an initiator, probably a customer care system (at some convenient time) has got access to an Operator Product Portfolio (OPP) and knows at least the names of the available products. When an end user contacts the customer care system, the customer is given a list of product/service types to select from. In this case the Duo-Com product is the interesting one, so a request is made for more information about the product/service type.

In step 1 the OPP, by using the product name and the fact that product information is wanted as parameters, looks in the product/service type information table where all aspects of information and where to find it is located.

In step 2, assuming that the customer wants the product or service (a product is used by example below), a feasibility check is made to check if it is possible to implement the product or service with the existing conditions, i.e. if all prerequisites are fulfilled. Now a "call" for this code is made. As the execution starts, this code uses the product type input to look in the Product type hierarchy. By looking here it is possible to find out which (sub)products the DuoCom product is composed of. In this case the four product types ISDN Access, E-mail, Personal Homepage and 020-connection will be found. As they in turn may consist of additional, more simple products, the Product type hierarchy is once again examined to see if the new products have sub products and so on until no more product types are found.

As some of the (sub)products may be optional, i.e., the end customer has to be asked which (sub)product is desired and informed about the possible choices. This results in an interactive loop in which the customer picks the desired (sub)products. As these (sub)products are selected, the Product type operation parameters and the Product type parameter tables are examined to find out which parameters are needed. As this selection of (sub)products is dynamic to its nature, the Product type relations table is examined to check that combinations of incompatible product types are not accidentally created. When this loop has ended, the Product type prerequisites and the Product type resource prerequisites tables are examined with regard to Product instance data and resource data, if the sufficient amount of resources or existing product instances are available, so that it is possible to instantiate this new product instance.

In step 3 the Product type cost and Product type hierarchy tables are examined to get the cost for all individual (sub) products. It is however left to the customer care system to interpret and customize this information for the customer. This price system may be in an internal currency and the customer care system may transform this currency into a local currency.

In step 4, assuming that the feasibility showed that implementation was possible, the created instance order may be issued, i.e. to take all data from the feasibility and create one or several product instantiation orders. This will insert one or more product orders in Product order tables and result in a tree of product instances in the Product instances tables.

In step 5, when the time of delivery arrives, it is finally up to the provisioning processor to activate the product,. i.e. traversing the product instances in the product instance hierarchy and to read out all data and give orders to the underlying resource managers to activate the reserved resources.

Figure 4:
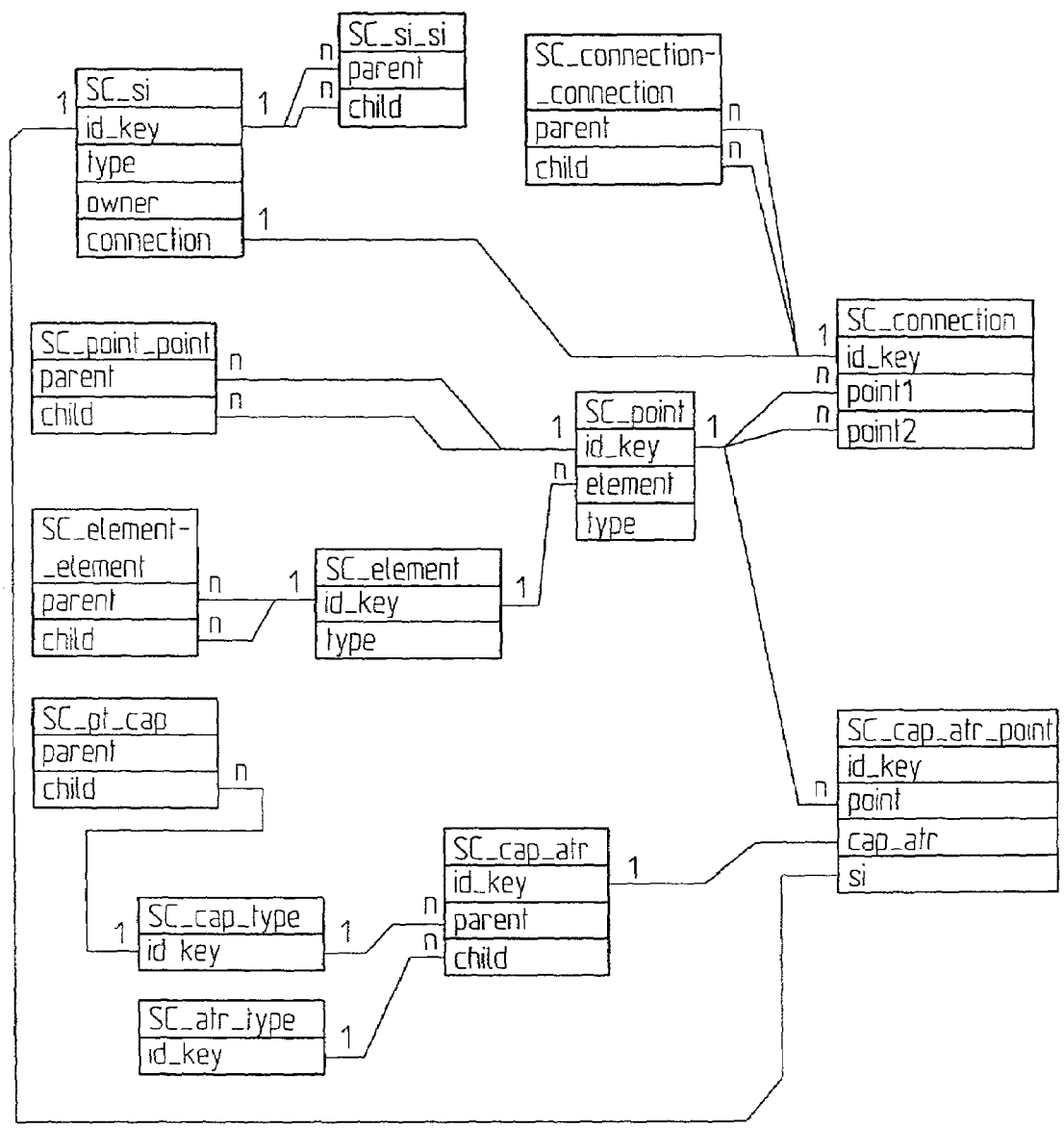
FIG. 4 is a block diagram which illustrates the relational structure of a service and resource database arrangement.

All data is stored in a relational database(s), see FIG. 4 which shows the table names and the fields in each table that has relations to/from them together with the relationship type, e.g., 1, n is one-to-many. The tables may be created by reading from standard text files with SQL commands.

It should be emphasized that the terms "comprises" and "comprising", when used in this specification as well as the claims, are taken to specify the presence of stated features, steps or components; but the use of these terms does not preclude the presence or addition of one or more other features, steps, components or groups thereof.

Various embodiments of Applicants' invention have been described, but it will be appreciated by those of ordinary skill in this art that these embodiments are merely illustrative and that many other embodiments are possible. The intended scope of the invention is set forth by the following claims, rather than the preceding description, and all variations that fall within the scope of the claims are intended to be embraced therein.

What is claimed is:

1. A resource handler for use in an operational support structure for managing a telecommunications network, the resource handler comprising a service and resource database arrangement containing information regarding network resources, wherein the database arrangement is structured so that each resource in the network has a time of existence as well as a place in a hierarchy of parent/child relations, and each resource being defined by data comprising:
   a point identifier that has characteristics associated to it, representing an abstract description of the resources capabilities;
   an abstraction of a common network element represented by a group of points that are considered to belong together; and
   a connection being defined by two connected points;
   wherein the database arrangement is structured so as to model a usage view, which includes what resources are combined to form a complete service instance and the time when that service instance exists.

2. The resource handler according to claim 1, wherein the point identifier also has characteristics associated with it in the form of a list of label/value pairs.

3. The resource handler according to claim 1, wherein the common network element acts as a container for points, with an implicit characteristic that points on elements may cross-connect.

4. The resource handler according to claim 1, wherein the database arrangement is structured so as to model a topological view.

5. The resource handler according to claim 1, wherein the database arrangement is structured so as to model a time view.

6. The resource handler according to claim 1, wherein the database arrangement is structured so as to model a hierarchic view.

7. The resource handler according to claim 1, wherein the database arrangement is structured so as to model a characteristic view, which includes a list of characteristics of each resource.

8. The resource handler according to claim 1, wherein the database arrangement structure is integrated in a data model for enabling control of each resource and the use of it in service instances.

9. The resource handler according to claim 1, wherein the database arrangement is separated into a first database comprising resource types and resource instances and a second database comprising service types and service instances.

10. The resource handler according to claim 1, wherein resource and/or service attributes are typed to distinguish between attribute types.

11. The resource handler according claim 1, wherein the resource handler is a service type handler in an operational support structure for a telecommunications network, for creating and maintaining service type recipes and their relations.

12. The resource handler according to claim 11, wherein the service type recipes provide a framework for service types, operations on service types, parameters on service types, hierarchical relations between service types, hierarchical parameter relationship, and translation of service types and associated parameters values into resource requirements and service type requirements.

13. The resource handler according to claim 11, wherein the resource handler supports selecting between different types of required services, different types of required resources and different service instances.

14. The resource handler according to claim 13, wherein the selected resources requirements are transferred to a resource handler that does the actual resource allocation.

15. A method of structuring information in a resource handler database for use in an operational support structure for managing a telecommunications network, the support structure comprising a service and resource database arrangement containing information regarding network resources, the method comprising the steps of:

allocating to each resource in the network a time of existence as well as a place in a hierarchy of parent/child relations; and defining each resource by associating data comprising:
- a point identifier That has characteristics associated with it representing an abstract description of its capabilities;
- an abstraction of a common network element represented by a group of points that are considered to belong together; and
- a connection being defined by two connected points;

wherein the database arrangement is structured so as to model a usage view, which includes what resources are combined to form a complete service instance and the time when that service instance exists.

16. The method according to claim 15, wherein the characteristics associated with the point identifier include a list of label/value pairs.

17. The method according to claim 15, wherein the common network element acts as a container for points, with the implicit characteristic that points on elements may cross-connect.

18. The method according to claim 15, wherein the database arrangement is structured so as to model a topological view.

19. The method according to claim 15, wherein the database arrangement is structured so as to model a time view.

20. The method according to claim 15, wherein the database arrangement is structured so as to model a hierarchic view.

21. The method according to claim 15, wherein the database arrangement is structured so as to model a characteristic view.

22. The method according to claim 15, wherein the database arrangement structure is integrated in a data model for enabling control of each resource and the use of it in service instances.

23. The method according to claim 15, further comprising the steps of:
- separating the database arrangement into two separate databases, and
- keeping resource type data and resource instance data in one of said separate databases, and
- keeping service type data and service instance data in the other of said separate databases.

24. The method according to claim 15, further comprising the steps of:
- assigning types to resource and/or service attributes, and
- using said attribute types to distinguish between different types of attributes.

* * * * *